United States Patent [19]

Hsu

[11] Patent Number: 4,626,289
[45] Date of Patent: Dec. 2, 1986

[54] TREATED GLASS FIBERS AND AQUEOUS DISPERSION AND NONWOVEN MAT OF GLASS FIBERS

[75] Inventor: Ed C. Hsu, Pittsburgh, Pa.

[73] Assignee: PPG Industries, Inc., Pittsburgh, Pa.

[21] Appl. No.: 717,278

[22] Filed: Mar. 28, 1985

Related U.S. Application Data

[62] Division of Ser. No. 422,771, Sep. 24, 1982, Pat. No. 4,536,447.

[51] Int. Cl.$^4$ .................. C08L 91/00; D02G 3/00
[52] U.S. Cl. .................. 106/287.34; 106/267; 65/3.41; 65/3.1; 428/391; 428/392
[58] Field of Search .................. 162/156, 173, 182; 428/375, 392, 391; 106/267, 171, 288 B, 287.34; 65/3.1, 3.41

[56] References Cited

U.S. PATENT DOCUMENTS

| | | | |
|---|---|---|---|
| 3,850,869 | 11/1974 | Mohr | 260/29.6 MN |
| 3,869,308 | 3/1975 | Graham | 117/126 GB |
| 3,997,306 | 12/1976 | Hedden | 65/3 C |
| 4,002,445 | 1/1977 | Graham | 65/3 C |
| 4,052,256 | 10/1977 | Renaud et al. | 162/145 |
| 4,052,257 | 10/1977 | Hill et al. | 162/156 |
| 4,110,094 | 8/1978 | Motsinger | 65/3 C |
| 4,118,272 | 10/1978 | Ziegler et al. | 162/156 |
| 4,178,203 | 12/1979 | Chakrabarti | 162/156 |
| 4,178,204 | 12/1979 | Chakrabarti | 162/156 |
| 4,178,206 | 12/1979 | Chakrabarti | 162/156 |
| 4,179,331 | 12/1979 | Chakrabarti | 162/156 |
| 4,183,782 | 1/1980 | Bondoc | 162/156 |
| 4,185,138 | 1/1980 | Graham | 428/391 |
| 4,244,844 | 1/1981 | Molinier | 428/391 X |
| 4,265,704 | 5/1981 | Nahta | 162/156 |
| 4,274,916 | 6/1981 | Grose | 162/145 |
| 4,284,470 | 8/1981 | Bondoc | 162/123 |
| 4,284,538 | 8/1981 | Graham | 162/156 X |
| 4,330,444 | 5/1982 | Pollman | 428/378 X |
| 4,370,169 | 1/1983 | Graham | 162/156 |

FOREIGN PATENT DOCUMENTS

0003475 10/1978 European Pat. Off. .

Primary Examiner—Lorraine T. Kendell
Attorney, Agent, or Firm—Kenneth J. Stachel

[57] ABSTRACT

Treated glass fibers having adequate protection for gathering into strands and when chopped being more dispersible in aqueous media. The treated glass fibers have a coating of an aqueous treating composition having nonionic surfactant and a cationic quaternary ammonium salt surfactant and one or more organo polar functional coupling agents. In addition, the aqueous treating composition can also have one or more water dispersible, emulsifiable or soluble polyols. Glass fibers treated with the aqueous treating compositions and produced into wet or dry chopped glass fiber strands having a length of 1/16 of an inch to about 3 inches, and having good dispersibility in aqueous media with or without addition of dispersing agents. Nonwoven, sheet-like mat produced from aqueous dispersions having the chopped treated glass fibers, where an amount of water is removed usually by vacuum, suction or thermal means and where polymeric binders, commonly referred to as wet strength binders, are applied and the mat is cured. The resulting nonwoven, sheet-like mat product has very good strength properties for use as a reinforcing element for roofing products, construction products and flooring products.

5 Claims, 1 Drawing Figure

TREATED GLASS FIBERS AND AQUEOUS DISPERSION AND NONWOVEN MAT OF GLASS FIBERS

This patent application is a division of Ser. No. 422,771, filed Sept. 24, 1982 now U.S. Pat. No. 4,536,447.

The present invention is directed to treated glass fibers that are readily dispersible in aqueous solutions, and that can be used in producing glass fiber-containing, binder impregnated, sheet-like mat having good strength properties.

The production of glass fibers from molten glass involves attenuating fibers from small orifices in a bushing in a glass melting furnace. The glass fibers are usually attenuated by a mechanical means and are usually gathered into one or more strands and are either collected as continuous strands on a winder or are chopped and collected as wet chopped glass fiber strands. During the attenuation and before the numerous glass fibers are gathered into one or more strands, a treating composition, which is known as a sizing composition, is applied to each of the glass fibers. The aqueous sizing composition is necessary to provide protection to the glass fibers from interfilament abrasion, especially when the fibers are gathered together as strands. Also, the sizing composition can be used to promote compatability between the glass fibers and any matrix in which the glass fibers are to be used for reinforcement purposes. The collected continuous strands, or chopped strands can be dried, or the wet chopped strands can be packaged in their wet condition. The dried continuous glass fiber strands can be chopped or combined with other glass fiber strands to form rovings, or produced into continuous strand mats or woven. Such steps depend upon the ultimate use for the glass fibers.

Glass fibers have been used by themselves and in combination with other types of fibers in the production of paper-like sheet materials. Glass fibers have been used as such a supplemental fiber in speciality, synthetic, fiberboard, pulp and composite papers. Also, the glass fibers are finding a use in glass fiber paper, which is a substitute for papers made of asbestos fiber. Also, in recent years, there has been increasing use and an industry desire for further use of a nonwoven, sheet-like mat of chopped glass fibers and/or strands as a replacement for organic felts such as cellulose mats in roofing shingles and builtup roofing systems (BUR systems). This usage and further expanded usage of the glass fiber mats in the roofing industry is based on several advantages of using the glass fiber mat. These advantages include: the reduction in the amount of asphalt necessary for the roofing products, the reduction in the weight of the roofing products, increased production rates for producing the roofing products, superior rot resistance, longer product life, and improved fire ratings. These types of papers made with a nonwoven, sheet-like mat are usually produced in a process where chopped fibers or chopped fiber strands are dispersed in an aqueous solution and formed into a mat of chopped glass fibers and/or strands. The nonwoven, sheet-like, mat product is produced by contacting the mat of glass fibers with a polymeric binder. An example of a process to produce such a mat product is the "wet-laid process".

The wet-laid process involves forming an aqueous slurry of chopped fibers or chopped strands usually with agitation in a mixing tank. The aqueous slurry, usually referred to as slush, is processed into the wet-laid, nonwoven, sheet-like mat product by such machines as cylinder or Fourdrinier machines or more technologically advanced machinery, such as the Stevens Former, Roto Former, Inver Former and the VertiFormer machines. The slush is deposited in some manner from a head box onto a moving wire screen or onto the surface of a moving wire-covered cylinder. The slurry on the screen or cylinder is processed into the nonwoven, sheet-like mat by the removal of water, usually by suction and/or vacuum devices, and by the application of a polymeric binder with further removal of water and excess binder by suction and/or vacuum devices. The binder impregnated nonwoven, sheet-like glass fiber mat is dried and cured in one or more ovens.

The strength of the nonwoven, sheet-like mat of glass fibers must be sufficient to withstand the processing steps and speeds, and desirably permit the use of higher speeds used to produce the nonwoven, sheet-like mat into various end products. In addition, the strength of the sheet-like mat must be sufficient to permit the mat to be stored in any desirable form, possibly for extended periods of time without loss of its cohesive properties. Also, the finish on the glass fibers in the sheet-like mat should enable the stored mat to be processed into end use products without cracking or without the production of large amounts of static being generated during use. The efficient processability of the nonwoven, sheet-like mat into various end products depends on the strength properties of the sheet-like mat and also the structure and homogeneity or uniformity of the arrangement of glass fibers in the mat itself.

Also, the strength of the sheet-like mat is important for the strength that the mat gives to any end product incorporating the mat. For example, when the sheet-like mat of chopped glass fibers and/or strands is to be utilized in producing roofing products, such as shingles and the mat for BUR systems, the sheet-like mat must have sufficient strength properties to enable the processing of the sheet-like mat into these products. The roofing industry is seeking higher strengths for these products and this is especially true for hot-wet tensile strengths and flexibility characteristics of the sheet-like mat.

The uniformity of the arrangement of chopped glass fibers and/or strands in the nonwoven, sheet-like mat of chopped glass fibers and/or strands contributes to the strength of the mat and of the ultimate end product. One problem that exists in preparing a uniform mat of chopped glass fibers and/or strands from an aqueous dispersion is that glass fibers are not easily dispersed in aqueous media. This difficulty in dispersing the glass fibers occurs initially upon adding the glass fibers to water. The dispersibility is further complicated by the tendency of the glass fibers, once they are present and evenly scattered to some degree in the aqueous medium, to reagglomerate to some degree. The reagglomerated glass fibers are very difficult to redisperse. The lack of a good dispersion of the glass fibers in the aqueous medium hampers the formation of a uniform mat, and adversely affects the strengths of any resultant sheet-like mat or end product incorporating the mat.

Over the years the art has attempted to deal with the difficulty of dispersing glass fibers in aqueous media by using various approaches. One early approach was to maintain an acid pH in the aqueous media to which the glass fibers are added, but such a system required expensive processing equipment due to the acidic nature of the aqueous solution. A more recent approach is to use a sizing composition for the glass fibers having a polysiloxane such as that shown in U.S. Pat. No. 4,052,256. Other sizing compositions having been used such as those shown in U.S. Pat. Nos. 4,052,257; 4,185,138; 4,284,538, and 4,330,337. These sizing compositions are used to treat glass fibers that are dispersed in water with the aid of dispersing agents. Another approach is to add dispersing agents such as amine oxides and/or others to the aqueous media to which the glass fibers are added. This approach is independent of whether the glass fibers are sized or unsized. Such dispersing agents are disclosed in U.S. Pat. Nos. 4,178,203; 4,178,204; 4,178,206; 4,179,331; 4,183,782 and 4,265,704.

In several of the approaches of the prior art to achieve a uniform aqueous dispersion of glass fibers, a treating composition placed on the glass fibers to assist in protecting the glass fibers from interfilament abrasion may actually reduce or inhibit the dispersibility of the glass fibers or the glass fiber strands in aqueous media, when certain dispersing agents are used. It would be advantageous to have treated chopped glass fiber strands, where the sizing composition protects the fibers from interfilament abrasion, and where the sizing assists in dispersing the glass fibers and/or strands in aqueous media without the need for expensive dispersing agents. It would also be advantageous to have a treating composition and treated glass fibers that are readily dispersible in aqueous media with or without the use of dispersing agents, which enables the production of binder-containing, nonwoven, sheet-like mat of glass fibers having good strength and flexibility properties, especially those like hot-wet tensile strength retention.

It is an object of the present invention to provide treated glass fibers that are adequately protected from interfilament abrasion, where the fibers are in the form of bundles of fibers, and at the same time, that have good dispersibility in aqueous media, are useful in forming aqueous dispersions of chopped glass fibers and/or strands that can be produced into nonwoven, sheet-like mat having good strength properties.

It is a further object of the present invention to have nonwoven, sheet-like mats having one or more binders having good strength properties, such as good wet-strength properties, dry-strength properties, and tear-strength properties to allow for good processability of the mats themselves, and of the mats into resulting products, such as base materials for roofing products like BUR systems and shingles and flooring.

SUMMARY OF THE INVENTION

Accordingly, the foregoing objects and other objects gleaned from the following disclosure are accomplished by the present invention.

The treated glass fibers of the present invention have been treated with an aqueous composition applied to the glass fibers in any manner, where the composition comprises a nonionic surfactant and a quaternary ammonium compound of the onium class of compounds, where the ratio of the nonionic surfactant to the quaternary ammonium compound is in the range of about 1 to about 99 to about 99 to about 1, one or more coupling agents having an organic and an inorganic polar functional moiety, and water in sufficient amounts to give a total solids for the treating composition in the range of about 0.5 to about 25 weight percent. Additionally, the treating composition may have one or more water soluble, dispersible and/or emulsifiable polyols that are dihydroxy or polyhydroxy functional and stable at temperatures up to about 120° C.

The treated glass fibers have an amount of the treating composition in the range of about 0.01 to about 5 weight percent on a loss on ignition (LOI) basis, where the treated glass fibers are in the form of bundles and/or strands. The treated glass fibers can be in any form such as continuous glass fiber strands or chopped glass fiber strands, which are produced as wet chopped or dry chopped glass fiber strands. When these treated glass fiber strands are dispersed in aqueous media, the use of a dispersion system or one or more dispersing agents is not needed, but these agents can be used because the treated glass fibers do not interfere with the function of the dispersing agents.

A second aspect of the present invention is an aqueous dispersion of chopped, treated, glass fibers and/or strands. A third aspect is a nonwoven, sheet-like, glass fiber-containing mat produced from such a dispersion by the removal of some water from the aqueous dispersion that is present on a wire screen or cylinder. The glass fiber-containing mat is contacted with the one or more polymeric binders to produce the nonwoven, sheet-like, mat product having good strength properties such as wet and dry tensile strength and tear strength to be useful as a base or supporting layers in roofing products and flooring products and other products, where a good strength mat is required along with a Class A fire rating and good rot resistance.

DETAILED DESCRIPTION OF THE INVENTION

The treating composition of the present invention provides good protective properties for the glass fibers, when they are gathered into strands for continuous glass fiber strands, or they are in the form of chopped glass fibers and/or strands. Hereinafter, in the specification and claims, both fibers and strands will be referred to collectively as fibers. When the chopped treated glass fibers are dispersed in any type of aqueous media, the treated glass fibers of the present invention provide for good dispersibility in the aqueous media even in the absence of a dispersing agent. In making and using a nonwoven, sheet-like mat of the glass fibers, good strength properties are required for the processability of the mat into end use products such as shingles and other roofing products or flooring products. Certain properties for these ultimate products are necessary. These properties include good tear strength and good flexibility and good wet, dry and hot wet tensile strength.

It has been discovered that all of these properties can be achieved with the use of the treated glass fibers, aqueous dispersion and glass fiber-containing nonwoven, sheet-like mat of the present invention. The achievement of obtaining good properties in all of these areas is effected by the synergistic influence of the chemical components making up the treating composition on the glass fibers, and the interrelationship between the chemical treating composition and the surface of the glass fibers, and the interrelationship between the treatment on the glass fiber surface and the polymeric binder used to make the nonwoven, sheet-like mat having a polymeric binder. I discovered that the use of the quaternary ammonium compound without the nonionic surfactant in a treating composition did not give the desired results. I also discovered that the use of the nonionic surfactant alone without the quaternary ammonium compound in a treating composition did not give the desired results. It was also discovered that when a coupling agent is present, particular coupling agents result in compositions giving better results than compositions having other types of coupling agents. In addition, it was discovered that for dispersing treated glass fibers in aqueous media, where a film forming material is needed on the glass fibers for additional protection of the fibers, the proper degree of protection for the fibers is provided in compositions having the nonionic surfactant, quaternary ammonium salt and coupling agents by the presence in the composition of particular polyols.

The treating composition of the present invention has one or more nonionic surfactants. It is believed without limiting the present invention to any degree that the nonionic surfactants function as a buffer for the quaternary ammmonium compound that has a very strong hydrophilic character. Useful nonionic surfactants include aqueous soluble and/or dispersible nonionic surfactants such as polyoxyalkylenes such as polyoxyethylene, where the solubility of these materials is due to the repeating ether linkages in a polyoxyalkylene chain such as $(CH_2CH_2O_2CH_2CH_2O_2CH_2CH_2O)_n$. The molecule may be comprised of many of these polymeric chains, and the hydrophilic tendency of these molecules is usually greater with increasing polyoxyalkylene content. Ordinarily complete water miscibility of the polyoxyalkylene surfactant can be obtained when the surfactant has about 60 to 75 percent by weight of the polyoxyalkylene polymer chains. Other nonionic surfactants that can be used include alkoxylated alkyl phenols such as aliphatic, alkoxylated alkyl phenols, linear substituted alkyl phenols and branch-chain substituted alkyl phenols, where nonexclusive examples of the alkyl groups include nonyl, octyl, dialkyl groups, linear alkyl, isooctyl, dodecyl, t-octyl and the like. The alkyl phenols can have an amount of polyoxyalkylene ranging from about 20 to about 95 weight percent of the alkyl phenols. Another type of nonionic surfactant that can be used is the alkoxylated aliphatic alcohols. A nonexclusive examples of which are alkyl poly(ethyleneoxy) ethanols and alkyl phenoxy poly(ethyleneoxy)ethanols and the like such as alcohols, which are primary and linear, oleyl alcohol, lauryl alcohol, cetyl alcohol, stearyl alcohol, tridecyl alcohol, myristyl alcohol, primary linear alcohols with about 8 to about 18 carbon atoms, tallow, normal alkyl alcohols, secondary alcohols with about 8 to about 18 carbon atoms, trimethyl nonyl alcohol, and the like. Another type of nonionic surfactant that can be used includes carboxylic esters such as glycerol esters, which are partial fatty acid esters of either mono or diglycerides of fatty acids. Nonexclusive examples of the glycerol ester include monococoate, monolaurate, monoricinoleate, monostearate, mono and di fatty acids, monooleate, tallow mono, cotton seed mono, safflower oil mono and polyalkylene glycol esters and polyoxyalkylene fatty acid esters such as polyoxyethylene esters of fatty, rosin, and tall oil acids, where the material has polyethylene glycol and polyoxyethylene along with various acids such as lauric, oleic, stearic, tall oil, fatty, coconut oil, rosin and the like, and where the molecular weight of the polyethylene glycol can vary from about 5 to about 4,000 and the moles of esterified polyoxyethylene can range from about 8 to about 40. Other nonionic surfactants that can be used are fatty acid esters of sorbitan, where nonexclusive examples of the sorbitan ester can be monolaurate, monostearate, monooleate, monopalmitate, and the like. Also, the polyoxyalkylene and/or polyalkylene derivatives of the sorbitan fatty acid esters can be used, where the sorbitan esters can be monolaurate, monostearate, monooleate, monopalmitate, and the like, and the oxyalkylene and/or alkylene, usually oxyethylene, units per mole of ester can vary from about 3 to about 30. Also, the glycol esters of fatty acids, where the glycol ester could be ethylene glycol or diethylene glycol or propylene glycol can be used. Another type of nonionic surfactant that can be used are the anhydrosorbitol esters and alkoxylated, especially ethoxylated, anhydrous sorbitol esters; and alkoxylated, especially ethoxylated, natural fats, oils and waxes such as castor oil, lanolin alcohols, carboxylic amides such as diethanolamine condensates; and polyoxyalkylene fatty acid amides, which are the mono and di adducts from alkoxylation, especially ethoxylation, of a fatty acid amide, where the fatty acid can be lauric, stearic, oleic, coco, and hydrogenated tallow and the like, and the amines can be isopropylamine, ethylamine, and the like. Also included are the polyoxyethylene fatty acid amides. Another type of nonionic surfactant that is useful is the polyalkylene oxide block copolymers such as the block copolymers formed from propylene oxide, butylene oxide, styrene oxide, and cyclohexane oxide and especially the polyoxypropylene-polyoxyethylene block copolymers. Another type of nonionic surfactant is the polysiloxane-polyoxyalkylene copolymers formed by the oxyalkylation of organo silicones to form a copolymer having a molecular weight of about 1500 for the propylene and ethylene oxide portions of the copolymer and about 1500 for the silicone polymeric moiety of the copolymer and the total molecular weight of the copolymer is around 6,000. Generally, the hydrophilic-lipophilic balance (HLB) ranges around 1 to about 30.5. The particularly useful nonionic surfactants from the aforelisted compounds are those that have a lower HLB range of less than around 10. Particularly suitable nonionic surfactants are the fatty nonionics that are dispersible in water.

The quaternary ammonium salt compounds useful in the treating composition of the present invention function as cationic surfactants and preferably, in addition, function as cationic surfactants. Nonexclusive examples of quaternary ammonium compounds useful in the treating composition of the present invention have the formula for quaternary ammonium salt of:

where one or more, but not all, of R, $R_1$, $R_2$ and $R_3$ can be selected from such compounds as stearyl, tallow, cetyl, lauryl, myristyl, alkyl, alkyls with about 8 to about 18 carbon atoms, tetradecyl, dodecyl, phenyl, alkyl phenyl, isohexadecyl and the like. The other Rs are lower alkyls with about 1 to about 5 carbon atoms or alkyl phenyls. In the formula X can be an anionic group such as chloro, fluoro, ido, bromo, hydroxyl, nitrate, sulfates or toluene sulfonate or phosphate and the like.

A particularly useful quaternary ammonium salt is an alkyl fatty quaternary sulfate. The most suitable quaternary ammonium salts are generally nonheterocyclic, although heterocyclic quaternary ammonium salts such as alkyl pyridinium halides can also be used.

Figure 1:
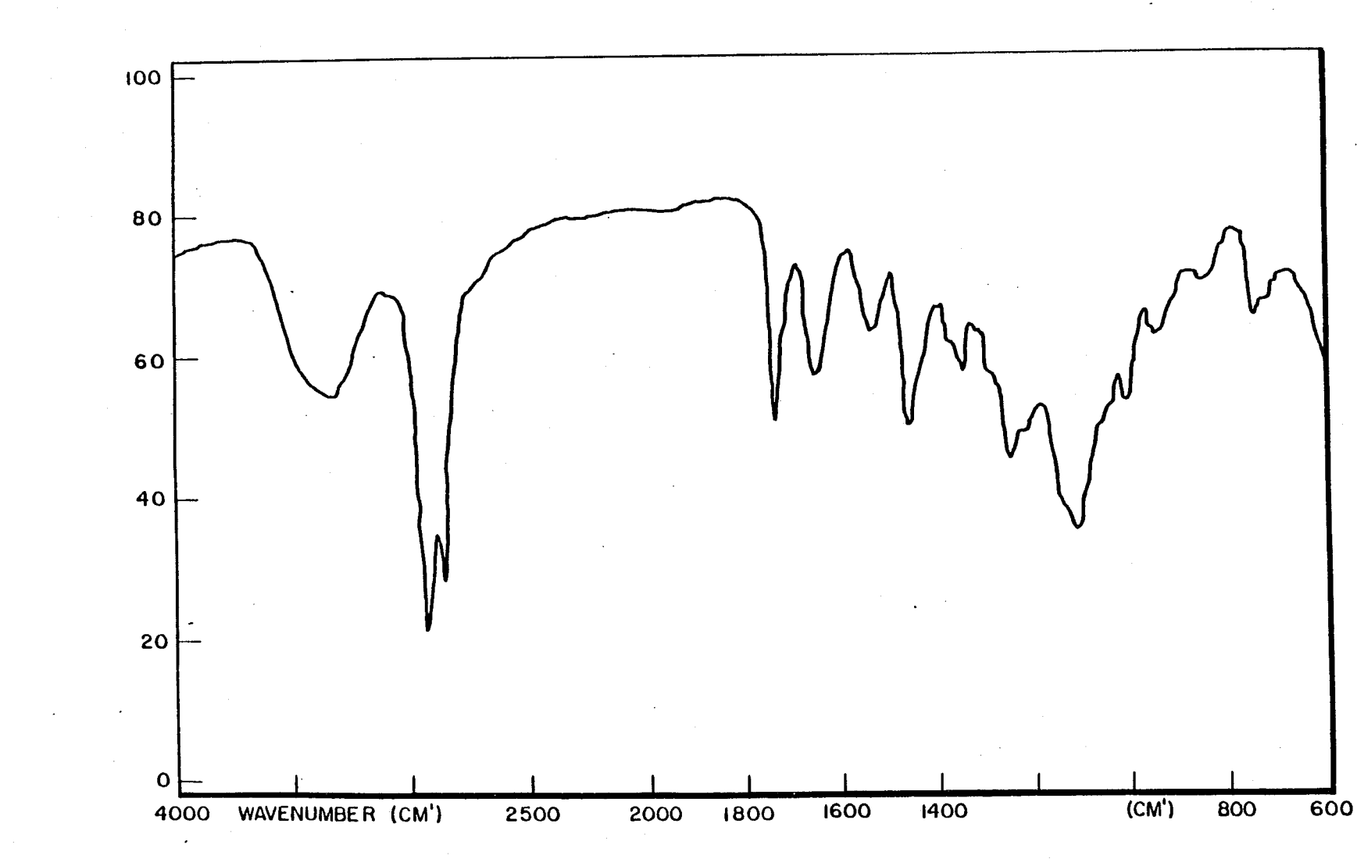
FIG. 1 shows an infrared spectrum (IR) of the blend of the nonionic surfactant and quaternary ammonium salt used in the treating composition of the present invention.

The ratio of amounts of the nonionic surfactant to the quaternary ammonium salt can range from about 1 to 99 to about 99 to 1 with the best results obtained at ratios of around 70:30 to around 30:70. Generally, the amount of nonionic surfactant present in the treating composition ranges from about 0.01 to about 5 weight percent. Generally, the amount of the quaternary ammonium salt present in the treating composition generally ranges from about 0.1 to about 5 weight percent of the aqueous treating composition. When the quaternary ammonium salt has an anion at the X position in the aforementioned formula, which increases the hydrophilic character of the quaternary ammonium salt, the nonionic surfactant can be one which has more hydrophobic character. Depending upon the anion in the quaternary ammonium salt and its effect on the hydrophilic character of the quaternary ammonium salt, the nonionic surfactant used with the quaternary ammonium salt can have more or less hydrophobic characteristic, but generally has an HLB of less than around 10. The nonionic surfactant and quaternary ammonium salt can be incorporated in the aqueous treating composition by sequential or simultaneous addition. The preferred method of adding the nonionic surfactant and the quaternary ammonium salt is by blending the two materials for addition to the aqueous treating composition. A particularly useful blend of the nonionic surfactant and quaternary ammonium salt has the IR spectrum of FIG. 1 and has a specific gravity of 0.996, an activity of 95 percent, a flash point of 125° F. (52° C.), 1600 centipoise (cps) with a #3 spindle and 30 rpm at 70° F. (21° C.) and is an opaque, amber liquid. Such a composition is that available as Amasoft PM Concentrate from American Color and Chemical Corporation, and this material is described as essentially 100 percent active blend of a fatty methosulfate quaternary compound and fatty nonionic surfactant.

The treating composition of the present invention has one or more organo-metallic or organo-silane coupling agents having polar organic functionalities through the presence of hetero-atoms like nitrogen, oxygen, chlorine and/or sulfur and the like. The organo-metallic coupling agents include complex compounds of the Werner type in which a trivalent nuclear atom, such as chromium, is coordinated with an organic acid such as methacrylic acid, and basic (hydroxy containing) metal salts of strong mineral acids such as basic chromium chloride, basic chromium sulfate, etc. The organo-silane coupling agent can be in its unhydrolyzed or hydrolyzed form, silanol form or in the siloxane polymeric form. Examples of the polar organic functionalities for the coupling agents that can be used are amino, acrylic, epoxy, thio, ureido, and chloroalkyl organic groups like the amino silanes, epoxy silanes and thiosilanes, ureidosilanes and chloropropylsilanes and lubricant modified variations of these silane coupling agents. It is suspected without limiting the invention, that the organic polar functionalities present with the coupling agents lead to chemical interactions with the polymeric binders used to impregnate the nonwoven, sheet-like mat, where the polymeric binder also has polar functionality.

Nonexclusive examples of silane coupling agents found particularly suitable for use in the treating composition of the present invention include amino functional silanes like those having the formula $NH_2-R_2-Si-(OR)_z$, where z is an integer from 1 to 3 or the corresponding hydrolysis Products such as corresponding silanols and/or polysiloxanes and $R_1$ can be the same or different moieties selected from lower alkyl or aliphatic hydrocarbons having less than eight and preferably less than 5 carbon atoms, and where $R_2$ is a biradical selected from the lower alkyl or aliphatic hydrocarbons having less than eight carbon atoms. Nonexclusive examples include gamma aminopropyltriethoxy silanes such as those commercially available from Union Carbide Corporation under the trade designations A-1100 silane coupling agent and A-1108 amino silane coupling agent that is modified with a lubricant, and A-1111 silane coupling agent, which is N-bis(betahydroxyethyl) gamma-aminopropyltriethoxy silane, and N-beta(aminoethyl)gamma aminopropyltrimethoxy silane (A-1120) and the like including diamino and polyamino silane coupling agents. Also useful are silanes like gamma mercaptopropyltrimethoxy silane (A-189) and ureido-modified amino silane (A-1160) and chloropropyltrichlorosilane (Z-6030) and vinylbenzylamine functional silane (Z-6032), where the A designated materials are available from Union Carbide Corporation and the Z-designated materials are available from Dow Corning Corporation. Also, epoxy silanes such as gamma-glycidoxypropyltrimethoxy silane (A-187) available from Union Carbide Corporation has been found particularly suitable for the present invention. Nonexclusive examples of epoxy silanes that can be used are the epoxy silanes having the general formula wherein X is an integer from 1 to 6 and R is a lower alkyl, for example, methyl, ethyl, propyl, isopropyl, etc., or epoxy silanes of the formula where z is an integer from 1 to 6 and these epoxy silanes include the corresponding hydrolysis products such as the corresponding silanols and/or polysiloxanes. Representative examples of the epoxy silanes include gamma-glycidoxyalkyl trimethoxy silane; gamma-glycidoxyalkyltriethoxy silane; delta-glycidoxy butyl trimethoxy silane; and 3,4-epoxy cyclohexylethyltrimethoxy silane; beta-glycidoxyethyltriethoxysilane; beta-(3,4-epoxy cyclohexyl)ethyl tri(methoxyethoxy)silane; beta-(3-epoxyethyl phenyl) ethyltrimethoxysilane; beta(epoxyethyl) ethyl triethoxysilane; 4,5-epoxy-n-hexyl trimethoxysilane; 15,16-epoxy-n-hexadecyltrimethoxysilane; 3-methylene-7-methyl-6-7-epoxy octyltrimethoxysilane. Also, the acrylic functional silane coupling agents such as gamma methacryloxyalkyltrimethoxy silane can be used. The amount of the coupling agent such as silane used in the treating composition of the present invention is in the range of about 0.01 to about 2 and preferably less than 1 weight percent of the total treating composition. The addition of nonpolar type coupling agents do not achieve any additional benefit in the performance of the treating composition and the performance of the treated glass fibers when used for preparation of a nonwoven, sheet-like mat.

In addition to the nonionic surfactant and quaternary ammonium salt compound with the organo-polar function coupling agents, the treating composition may have present one or more moderately water soluble or water dispersible or water emulsifiable polyol. It is believed without limiting the invention that the polyol compounds provide protection for the glass fibers from interfilament abrasion without giving the treated fibers too much adhesion or cohesion to retard the dispersibility of the chopped, treated glass fibers in aqueous media. Polyols suitable for use are the di or polyfunctional hydroxy compounds or polymeric compounds. It is preferred that the polymeric compounds are other than the polymeric compounds having a hydrocarbon backbone, that is, having the backbone repeating structure of $(CH_2)_n$ where n is any number from 50 to infinity. Useful polyols are those that are stable at temperatures up to about 120° C. Nonexclusive examples of these compounds include alkylene glycols having up to 6 carbon atoms such as ethylene glycol, propylene glycol, 1,2-butane diol, 1,3-butane diol; 1,4-butane diol or tetramethylene glycol, 2,3-butane diol, 1,4-hexane diol, pentamethylene glycol, hexamethylene glycol and the like; neopentyl glycol, hexylene glycol, pentaerythritol, dispentaerythritol, trimethyol propane, sorbitol, glycerine, and polyalkylene glycols having the formulae:

$$HO(CH_2CH_2O)_n H \quad (I)$$

$$HO(CH_2CH_2CH_2O)_n H \quad (II)$$

where $n$ is a positive integer of at least 2 and usually commercially is from 2 to about 25. Representative examples of this last class include di(ethylene) glycol, dipropylene glycol, tri(ethyleneoxy) glycol, dodecyl (ethyleneoxy) glycol; eicosyl (ethyleneoxy) glycol, tri(-propyleneoxy) glycol, dodecyl (propyleneoxy)glycol and the like. Also, ether polyols such as diethylene glycol, and triethylene glycols, dipropylene glycol and the like can be used. Also, glycol esters of fatty acids like laurate, palmitate, stearate, oleate, dilaurate, dimyristate and the like can be used. In addition, the higher boiling esters of glycols like acetates of methyl, ethyl and butyl monoethers can be used. Also, alkyl ethers of alkylene glycols, mono and diesters of ethylene or propylene glycols and alkylene glycols, polyalkylene glycols having a formula like formula (I) or (II), but where n is greater than about 25, ether esters and polyoxyalkylene glycols can be used.

A particularly useful class of polyols for the present invention, are those polyols having the polymeric polyols such as polyalkylene polyol and polyoxyalkylene polyols and mixtures thereof. The polyoxyalkylene polyols are from a class of compounds known as polyether polyols. The water dispersible, high molecular weight poly alkylene polyols can be made by any suitable method known to those skilled in the art such as the base catalyzed reaction of alkylene oxide, such as methylene oxide, ethylene oxide, propylene oxide, butylene oxide, and the like with triols such as glycerol, trimethylolpropane and 1,2,6-hexantriol. Polyols having four or more hydroxyl groups have similarly been reacted with the alkylene oxide to prepare the oxyalkylated derivatives. The higher alkylene materials and higher polyol materials such as pentaerythritol and sugar alcohols can be used if any resulting solid material is properly emulsifiable with surfactants in water. This relates to the water dispersible nature of the polyoxyalkylene polyol. So the polyoxyalkylene polyol can be either a solid or liquid as long as it is dispersible or emulsifiable or soluble in water. Nonexclusive examples of these polyether polyols include poly(oxypropylene) adducts of trimethylolpropane, poly (oxypropylene) adducts of glycerol; poly (oxypropylene-B-oxyethylene) adducts of trimethylol propane and the like. The average molecular weight range of these polyether polyols is generally about 300 to about 12,000 and preferably about 700 or more to around 10,000. Mixtures of these polyether polyols can be used such as a blend of a 7000 average molecular weight, liquid polyoxyalkylene polyol with a 10,000 average molecular weight, liquid polyoxyalkylene polyol. This blend can have any proportion of the two materials like a 50/50 blend. Commercial examples of these materials include the liquid polyalkylene polyol designated Pluracol ® V-7 polyol and the liquid polyoxyalkylene polyol designated Pluracol ® V-10 polyol both available from BASF-Wyandotte Corporation, Industrial Chemicals Group, Wyandotte, Mich.

The Pluracol ® V-7 polyol has the following properties:

| PLURACOL ® V-7 POLYOL TYPICAL PHYSICAL PROPERTIES | |
|---|---|
| Specific Gravity, 25° C./25° C. | 1.090 |
| Flash Point, °F. | 510 |
| Fire Point, °F. | 580 |
| Pour Point, °F. | +25 |
| Ash, Typical, % | 0.2 |
| Specification (max.), % | 0.3 |
| Viscosity, as-is, at 210° F., SUS | 930 |
| cs | 200 |
| at 100° F., SUS | 5600 |
| cs | 1200 |
| Viscosity of Aqueous | Solutions at 100° F. |
| 20% Solution, SUS | .49 |
| cs | 7.0 |
| 50% Solution, SUS | 380 |
| cs | 81.4 |
| Inverse Cloud Point (2.5% aqueous solution) °F. | 180 |
| Solubility | Pluracol ® V-7 is soluble in water, alcohols, and glycols |

The Pluracol ® V-10 polyol has the following properties:

| PLURACOL ® V-10 POLYOL TYPICAL PHYSICAL PROPERTIES | |
|---|---|
| Appearance | Pale, yellow, clear viscous fluid |
| Viscosity | |
| at 210° F. | 6,000 cst (AST D445-53T) |
| at 100° F. | 45,000 cst (AST D445-53T) |
| Specific Gravity 60/60° F. | 1.089 (BWC test) |
| Flash Point | 510° F. (ASTM D2-52) |
| Fire Point | 535° F. (ASTM D92-52) |
| Surface tension (1% aq.) | 54.7 dynes/cm. at 75° F. (ASTM D1331-56) |
| | 48.4 dynes/cm. at 105° F. (ASTM D1331-56) |
| | 44.2 dynes/cm. at 110° F. (ASTM D1331-56) |
| Shear Stability (in a typical fire resistant fluid) change in viscosity 12,000 cycles, 1000 psi | +1% (nod. VVL 1 method 3471) |

An even better suited class of polyol for use in the treating composition of the present invention to maximize the benfits achieved are the polyols that are liquids having a viscosity greater than about 30,000 centistokes at about 100° F. (38° C.) and about 1,000 centistokes at 210° F. (99° C.) and in particular, the less water soluble polymeric polyol like polyoxyalkylene polyols. The amount of the polyol present, if used, in the aqueous treating composition is in the range of about 0.1 to about 10 weight percent of the aqueous treating composition. The most useful amount, when used, in the aqueous treating composition of the present invention is a predominant amount of the solids of the composition. This is on the order of about 50 to about 95 weight percent or more of the solids (non-aqueous components) of the treating composition.

In addition to the foregoing chemical compounds, the treating composition of the present invention may have any of the chemical compounds that have not been specifically excluded which are known to be useful in aqueous treating compositions for treating glass fibers. For example, additional film forming polymers, lubricants and the like can be added. Another additional chemical compound that can be used is one or more water soluble or dispersible nonpolymeric amide compounds such as urea or monoamides, diamides, amine-containing amides, carbamide and derivatives, where the amide and amine groups are primary or secondary or mixtures thereof. Typically, when the amide compound is present, it is used in an amount in the aqueous sizing composition of about 0.1 to about 2 weight percent of the aqueous treating composition, when the amide has an activity equivalent to urea.

Also present in the treating composition of the present invention is a liquid carrier, which is preferably water, to make the treating composition an aqueous treating composition. The amount of water present in the aqueous treating composition is that amount necessary to give the treating composition a total solids content within a level, whereby the viscosity of the aqueous treating composition is effective for application to glass filaments, that is around 0.6 to about 50 centipoise at 140° F. (60° C.) Particularly, the amount of water present in the aqueous treating composition is sufficient to give a total solids (nonaqueous) content of the aqueous treating composition in the range of about 1 to about 25 percent by weight and preferably about 2 to about 10 percent by weight of the aqueous treating composition.

The treating composition of the present invention can be prepared by any method and with any equipment known to those skilled in the art for preparing aqueous treating compositions to be applied to glass fibers. For instance, the chemical compounds can be added sequentially or simultaneously to water or in any order whatsoever. When the chemical compounds are only slightly water soluble, it is better to dissolve these materials in warm water before diluting with cold water to prepare the aqueous treating composition in its final volume. This is especially true for the higher viscosity polyoxyalkylene polyols.

The aqueous treating composition can be applied to any type of glass fiber by any method known to those skilled in the art. For instance, the glass fibers can be prepared by mechanical attenuation or the like from batch compositions known as "E" glass or "621" glass or more environmentally acceptable derivatives thereof, and other types of glass such as "A" glass, "C" glass, "S" glass. The aqueous treating composition can be applied to the glass fibers after they are formed and during their attenuation by any type of applicator such as belt applicators, roll applicators or any applicator, which enables the liquid to contact the glass fibers. The amount of the aqueous treating composition applied to the glass fibers should be sufficient to give at least a partial or intermittent coating of the treating composition on treated glass fiber strand of around 0.01 to about 5 weight percent of the treated glass fiber strand. The treated glass fibers can be chopped directly as fibers or gathered into one or more glass fiber strands and chopped, where the fibers or strands are chopped during the process of forming the glass fibers after the treating composition has been applied to them into lengths varying from about 1/16 of an inch (1.59 mm) to about 3 inches (76.2 mm) and more particularly about ½ inch (12.7 mm) to about 1 inch (25.4 mm). Such a process is commonly referred to in the art as the wet chop process. Also the glass fibers can be treated and gathered into strands much like the wet chop process, but the fibers are collected as continuous glass fiber strands into a forming package and subsequently chopped in a remote wet chop process or after drying in a dry chop process into lengths similar to those of the direct wet chop process. In preparing the glass fiber strand, the filament diameter of the glass fibers making up the strands can vary from around 3 microns to around 20 microns or higher and preferably around 9 to 18 microns.

The aqueous dispersion of treated glass fibers is achieved merely by placing the wet or dry chopped glass fibers of the desired length into a bath of water with or without dispersing aids and with agitation to form an aqueous dispersion of glass fibers for use in the wet-laid process or with other paper making processes and machines. The amount of the chopped treated glass fibers in the aqueous dispersion can range from about 0.001 to about 5 but preferably about 0.01 to about 3 weight percent of the aqueous dispersion. Although the treated glass fiber strands of the present invention can be used without dispersion aids, any of the conventional dispersion aids can be used along with the chopped, treated glass fibers of the present invention. Nonexclusive examples of such dispersing aids that can be used include the polyoxyethylated tallow amine dispersing agent available from GAF Corporation under the trade designation "Katapol" agents used alone or in conjunction with thickeners like hydroxy and/or carboxy alkyl cellulose especially the hydroxy ethyl and hydroxy methyl celluloses and soluble or dispersible salts thereof such as that available from Hercules, Inc. under the trade designation "Natrasol" or other thickeners like Separan polyamide from Dow Chemical Co. and the like. Another example of a dispersing agent that can be used with the chopped glass fiber strands of the present invention is the dispersing agent available from Diamond-Shamrock Chemical Company under the trade designation "Nopcosperse" and especially the "Nopcosperse" FFD product. The Nopcosperse FFD product is a blend of alkyl sulfate quaternary of the alkyl amino fatty acid amide or amine in a water dispersible, mineral oil with an inorganic silica defoaming agent. Other examples of dispersing agents that can be used include the quaternary ammonium compounds such as those available under the trade designation "Arquad 2 HT-75" and the like. Also, quaternary ammonium surfactants can be used such as those available under the Arquad and Aliquat trade designations as can mixtures of amine oxides with derivatized guar gum and mixtures of guar gum and isostearic amides.

The nonwoven, sheet-like mat of treated chopped glass fibers can be made by any method and with any apparatus known to those skilled in the art. For example, a hand mold method and apparatus can be used or the Fourdrinier paper machine or cylinder machines can also be used. Also, the machines known as the Stevens former of the Beloit Corporation and the Rotoformer from the Sandy Hill Corporation and the Inver former from the Beloit Corporation and the Vertiformer from the Black Clawson Company can all be used to form the mat of the present invention. In the process, the aqueous dispersion of glass fibers may be diluted with white water and held in a head box of any of the aforementioned machines. The white water is water containing similar dispersing agents as the aqueous dispersion, where the white water is fresh and/or recirculated from collection points in the process of forming the nonwoven mat. The aqueous dispersion from the head box is placed on a screen or cylinder where some water is removed, usually by vacuum or suction apparatus. After sufficient water has been removed, the mat has a polymeric binder applied to it and any excess binder is removed by vacuum and/or suction means. The binder-containing mat is dried and cured in one or more ovens to produce the nonwoven, sheet-like mat. The mat may be collected usually in a large roll weighing from several hundred pounds to close to 1,000 pounds.

The polymeric binders that are used are any of the group of the so-called "wet-strength" resins, which include such resins as urea formaldehyde and cationic polyamide-epichlorohydrin commercially available from Hercules Incorporated under the trade name "Kymene 557 H" and cationic urea-formaldehyde resins available from Hercules, Inc. under the trade designations "Kymene 882" and "Kymene 917." Also, melamine-formaldehyde type and phenol formaldehyde type and resorcinol formaldehyde type and polymerizable polyfunctional N-methylol compounds, notably N-methylol ureas such as dimethylol urea and N-methylol melamine type resins and other amino resins known to those skilled in the art can be used. Other types of resins that can be used are polyvinyl alcohol, polyvinyl acetate, and acrylic polymers and copolymers. Also, mixtures of resins can be used such as the urea formaldehyde or melamine formaldehyde resins mixed with styrene butadiene copolymer latices and other latices and/or acrylic polymers or copolymers like acrylamide. The amount of binder used in the nonwoven, sheet-like mat product is in the range of about 3 to about 45 percent, preferably about 10 to about 30 percent based on the weight of the unfinished mat. If the amount of binder is too great, the porosity of the mat could be adversely affected, and, if the amount is too low, the integrity of the mat could be adversely affected. After the binder is applied, the binder-containing glass fiber mat is dried to set or cure the binder. This can be accomplished with can driers or any one or more drying devices used in the art.

The nonwoven, sheet-like, glass fiber mat of the present invention is suitable for use as a replacement for felt in shingles and also for use in builtup roofing (BUR) systems and for use as backing materials and base materials in flooring applications. In these applications, the mat with the polymeric binder must have certain strength properties. These strength properties are measured by dry tensile, wet tensile, hot-wet tensile and tear strength of the mat with the polymeric binder. A good mat and binder product must have adequate tensile strength and an adequate tear strength and a wet strength. The nonwoven, sheet-like mat of the present invention has these adequate properties and even further improved values for these properties as is shown in the examples of the present invention.

PREFERRED EMBODIMENT OF THE INVENTION

Glass fibers that are treated with the aqueous treating composition of the present invention are preferably those having filament diameters of around 9 to about 18 and most preferably, 16 microns. The aqueous treating composition preferably has the nonionic surfactant and quaternary ammonium salt compound added as a blend of these two materials. Also, preferably there is present a polyol having a viscosity of at least 30,000 centistokes at 100° F. (38° C.) and 1,000 centistokes at 210° F. (99° C.) as determined by ASTM method D445-53T and a polar functional silane coupling agent.

It is most preferred that the aqueous treating composition of the present invention have a high molecular weight liquid polyoxyalkylene polyol such as that available from BASF Wyandotte Corporation under the trade designation Pluracol® V-10 polyol. It is also most preferred that the blend of nonionic surfactant and quaternary ammonium salts is the 100 percent active cationic material having an ammonium salt compound that is a fatty metho sulfate quaternary ammonium sulfate compound and fatty nonionic surfactants as is available from American Color and Chemical Corporation under the trade designation Amasoft PM concentrate. This material is an opaque amber liquid having 95 percent activity and a viscosity of 1600 centipoise with a number 3 spindle at 30 rpm at 70° F. (21° C.) and a specific gravity of 0.996. It is further most preferred that the aqueous treating composition have an epoxy functional silane coupling agent. The preferred amounts of these materials are: for the polyol, an amount of about 0.1 to about 2 weight percent of the aqueous treating composition, and for the blend of the nonionic surfactant and quaternary ammonium salt an amount in the range of about 0.1 to about 2 weight percent of the aqueous treating composition, where the ratio of the nonionic surfactant to the quaternary ammonium salt in the blend is within the range of around 3:1 to 1:3 and the amount of the epoxy silane coupling agent, which is gamma-glycidoxypropyltrimethoxy silane, of about 0.03 to about 0.4 weight percent of the aqueous treating composition. The amount of water present in the aqueous treating composition is that sufficient to give a solids content in the range of about 0.1 to about 5 weight percent, and most preferably about 0.5 to about 1.5 weight percent.

The aqueous treating formulation is prepared by completely hydrolyzing the epoxy silane in a premix vessel in neutral water with a pH of about 6 to about 8. The liquid blend of nonionic surfactant and cationic quaternary ammonium salt, which is available commercially is added to water in a premix vessel, where the amount of water is sufficient to disperse the blend. The polyoxyalkylene polyol is dissolved in warm water of about 150°±10° F. (66° C.) completely before diluting with cold water. The materials in the premix vessel can be combined in any fashion though it is preferred to add the diluted blend to the epoxy silane solution and add the dissolved polyol to this mixture and then dilute with water to the final desired volume. If foam buildup occurs, any defoaming agent can be added but preferably the defoaming agent available from Diamond-Shamrock Company under the trade designation Nopco NDW is added.

The aqueous treating composition is used to treat the glass fibers preferably in a wet chop process, where the treated glass fibers are gathered into strands and chopped during the fiber formation and attenuation process. Preferably, the treated glass fibers are chopped into lengths ranging from about ½ inch (12.7 mm) to a little over 1 inch (25.4 mm). The treated glass fiber strands have an amount of the treating composition ranging from about 0.01 to about 1.5 percent of the treated glass fiber strands.

The treated chopped glass fiber strands are added to water to form a dispersion and it is preferred that a dispersing agent such as Katapol dispersant in combination with the Natrasol 250 HR thickener be added in amounts in the range of about 0.001 to about 0.05 weight percent for each material based on the weight of the dispersion. The chopped glass fibers are added to the aqueous solution with the dispersing agents in a preferred amount of about 0.1 to about 1.0, and thereafter, preferably diluted to about 0.01 to about 0.05 weight percent of the aqueous dispersion. The preferred polymeric material used to form the nonwoven, sheet-like mat is a urea formaldehyde modified to have anionic functionality, either by a blend of polymers or by the presence of anionic groups placed on the urea formaldehyde resin. The mat is dried and cured in an oven after any excess binder is removed by vacuum or suction means to produce the nonwoven, sheet-like mat of the present invention.

Additional information and further illustrations of the embodiment of the aqueous treating composition, treated glass fibers, dispersion and nonwoven, sheet-like mat of the present invention are presented in the following examples, although these examples do not limit the scope of the invention to these specific embodiments.

EXAMPLES

Five examples of the treating composition of the present invention and an illustrative example are given in Table I. Table I presents data of the formulations of these examples. These formulations were prepared in a manner identical to that disclosed in the specification and the preferred embodiment section of the specification for the various chemical compounds present in Examples 1–5 and the illustrative example.

TABLE I

| | Formulations for Aqueous Treating Composition | | | | | |
|---|---|---|---|---|---|---|
| | Example 1 gm/ wt %/wt % of Aq.[1] Solids[2] | Example 2 gm/ wt %/wt % Aq. Solids | Example 3 gm/ wt %/wt % Aq. Solids | Example 4 gm/ wt %/wt % Aq. Solids | Example 5 gm/ wt %/wt % Aq. Solids | Illustrative Example gm/ wt %/wt % Aq. Solids |
| Lubricant modified gamma-aminopropyltriethoxy silane (A-1108) | — | 30/.08/4.9 | — | 30/.08/9 | — | — |
| Gamma-glycidoxypropyltri-methoxy silane (A-187) | 30/.08/6.9 | — | 30/.08/9 | — | 30/.08/4.9 | — |
| Vinyl tris(2-methoxyethoxy) silane (A-172) | — | — | — | — | — | 30/.08/9 |
| Blend of fatty nonionic surfactant and fatty methosulfate quaternary compound (Amasoft PM) | 140/.36/37.8 | 300/.78/57 | 300/.79/91 | 300/.79/91 | 300/.78/57 | 300/.79/91 |
| Polyvoxyalkylene adduct of Trimethylol | 200/.53/54.1 | 100/.26/19 | — | — | — | — |
| Diethylene glycol | — | — | — | — | 100/.26/19 | — |
| Urea | — | — | — | — | 100/.26/19 | — |
| Water | SUFFICIENT TO GIVE 10 GALLONS (37.85 liters) | | | | | |

[1]Weight percent of aqueous composition.
[2]Weight percent of the solids present in the composition The treating compositions of the examples of Table I were used to treat glass fibers having a filament diameter of around 15.88±0.63 microns in a wet chop forming process. The individual glass fibers were gathered into strands and chopped into lengths, where the average length of the chopped glass fiber strand was around 0.5 inch (12.7 mm.). In obtaining six separately treated chopped glass fiber strand samples from the six examples of the treating formulation of Table I, all of the glass fibers were treated in a similar manner with a belt-type applicator, where the glass fibers were attenuated at a similar speed and the belt type applicator was driven at a similar speed. The amount of the treating composition present on the treated glass fibers was around 0.05 to about 0.5 percent on a loss on ignition (LOI) basis. These various samples of treated chopped glass fiber strands were used to make six separate aqueous dispersions of glass fibers. Also, an aqueous dispersion of a commercially available chopped glass fiber was prepared into a seventh separate nonwoven, sheet-like glass mat. These dispersions were impregnated with the same binder. These seven nonwoven, sheet-like mat samples were then tested for various physical properties. These properties tested included dry tensile, wet tensile, hot-wet tensile, hot-wet retention and tear strength.

The nonwoven, sheet-like mats of glass fibers were prepared by a hand sheet making procedure. The procedure involved using a sheet mold with a 55 gallon (208 liters) drum used for recirculating white water. An anionic urea formaldehyde resin commercially available from Pacific Resins under the trade designation 3958-F was placed into a solution in a premix vessel. The sheet mold was flushed and cleaned as were the connecting lines and the 55 gallon drum recirculating tank. The white water was prepared by filling the 55 gallon drum with 27.5 gallons (104 liters) of city or a specified water. To this there was added an amount of thickener, which was Natrasol 250 HR, and the mixture was stirred for around 2 minutes. A pH modifier was added to adjust the pH to around 8 to 8.5 with stirring. A wetting agent, preferably Katapol dispersing agent, was added and the mixture stirred for around 2 minutes. In a premix bucket, the slurried glass fiber solution was prepared by adding around 15 liters of city water and stirring was performed by a lightning mixer with an air pressure set about 10 psi (0.68 atmosphere). The Natrasol 250 HR thickener, ammonium hydroxide, and Katapol agent were added in a sequence similar to the preparation of the white water and the mixture was stirred for 10 minutes. An amount of 75 grams of glass fiber based on 0% moisture were added to make a 0.5 weight percent batch of slurried fibers and the mixture was stirred for 5 minutes at 20 psi (1.36 atmosphere). The seven nonwoven, sheet-like mats were prepared by filling the sheet mold from the screen up with around 35 liters of white water using a sump pump, which is submerged in the 55 gallon drum recirculating tank. Any air bubbles that formed on the screen were removed with a plunger. Around 1450 ml. to 1500 ml. of the 0.5 percent slurried fiber glass batch solution was added to the water in the sheet mold. On final dilution, this gives a percentage of 0.02 percent. The water is agitated with a plunger in the sheet mold. After five seconds, the white water is drained back into the 55 gallon drum and the sheet mold is opened and the screen and glass mat are carefully removed together. The glass mat is dewatered carefully by slowly and evenly pulling the mat and screen away from the mold and over a slot having dimensions of 3/16 of an inch (4.76 mm) by 12 inches (304.8 mm), or whatever length. The anionic urea formaldehyde resin is applied to the glass mat with a paint sprayer by evenly spraying and saturating the mat without causing any distortion in the mat format. The excess resin is removed from the mat by pulling the mat and screen evenly and smoothly away from the slot across a vacuum bar. The mat and screen are flipped over a piece of available fabric and the screen is removed and the fabric and mat are placed in a forced air oven at a temperature around 240 to around 270° F. (116° C.–132° C.) for approximately five minutes to dry. After drying is completed, the sheet is ready for curing and testing. This curing is accomplished by placing the glass mat in a forced air oven at a temperature around 390° to 410° F. (199° to 210° C.) for around 2 minutes.

The tensile strength of the nonwoven, sheet-like mat was measured under various conditions using a sample of the material, which was 1 inch (76.2 mm) by 7 inches (178 mm). The dry tensile of the sample was tested in an Instron testing machine with a jaw distance of 5 inches, where the jaws were padded or taped sample ends. The crosshead speed used for the Instron machine was 6.2 inch (304.8 mm) per minute. In the dry tensile test, the sample was placed in the Instron and the breaking point was measured in pounds per inch. Another sample that was 3 inches by 7 inches was soaked in water for a period of 5 minutes and then tested in the Instron testing machine under the same conditions as the dry tensile test to obtain wet tensile strength data. Another sample that was 3 inches by 7 inches was treated in a hot water bath at a temperature of 180° F. (82° C.) for a period of time of 10 minutes. This treated sample was then tested in the Instron testing machine using a similar procedure as that for the dry and wet tensile to obtain hot-wet tensile data. The hot wet retention was calculated as a percentage and was determined in the following manner.

$$\% \text{ Hot wet retention} = \frac{\text{Hot wet tensile}}{\text{Dry tensile}} \times 100\%$$

The tear strength of the sample was measured according to a standard test of the American Society of Testing Materials (ASTM), test procedure D689 with a revision using the Elmendorf tear tester. The revision allows the use of data on reinforced glass mats, where the tear may deviate from the initial slit in the sample instead follow a reinforcing strand.

The binder distribution in the nonwoven, sheet-like mat was tested according to a loss on ignition (LOI) test. The sample weight was 5 to 7 grams and the temperature of treatment was 600° ±25° C. for a period of time of 15±1 minute. The procedure involved using three samples laid across a sheet, which was subjected to the temperatures for the stated time. The LOI is recorded to the nearest 1/10 percent for each sample.

Table II presents the data from these tests for the glass fibers treated with the aqueous treating composition of Examples 1–5, the illustrative example and the commercial examples. The nonwoven, sheet-like mat of glass fibers prepared from the commercial chopped glass fiber product shown in Table II were prepared in the same manner as the mats made of the chopped glass fiber treated with the formulations of Table I. The commercial chopped glass fiber product is from PPG Industries, Inc.

TABLE II

| Properties of Nonwoven, Sheet-like Glass Mat | | | | | | | |
|---|---|---|---|---|---|---|---|
| | Example 1 | Example 2 | Example 3 | Example 4 | Example 5 | Illustrative Example | Commercial Example |
| Mat Wt. gm/ft$^2$/gm/m$^2$ | 12.1/130.6 | 11.4/123.0 | 11.9/128.4 | 11.0/118.7 | 11.1/119.8 | 11.7/126.4 | 11.7/126.4 |
| Percent LOI of Binder (% LOI) | 20.39 | 20.45 | 19.4 | 19.73 | 20.78 | 18.92 | 19.73 |
| Dry Tensile (lb/in) | 50.8 | 46.9 | 53.1 | 45.8 | 49.6 | 47.2 | 43.9 |
| Wet Tensile (lb/in) | 37.9 | 29.3 | 35.5 | 29.4 | 29.1 | 28.6 | 25.9 |
| Hot-Wet Tensile (lb/in) | 28.2 | 20.8 | 20.1 | 19.5 | 16.1 | 17.6 | 13.0 |
| Hot-Wet Retention % | 56 | 44 | 38 | 43 | 33 | 37 | 30 |
| Tear Strength | 968 | 909 | 981 | 773 | 1034 | 915 | 1051 |

The foregoing has described treated glass fibers having adequate protection to the glass fibers, when they are gathered into strands for processing of the strands. Also described are treated glass fiber strands, which when chopped, have good dispersibility in aqueous media with or without dispersing aids. Another feature of the present invention aforedescribed is an aqueous dispersion of chopped glass fibers, where the dispersion has good uniformity which leads to good properties for the mat impregnated with a binder. The mat is useful as a substitute for felt in the production of shingles, and also as a base or reinforcing material in roofing such as built-up roofing systems and also as a base or reinforcing material for flooring applications. The foregoing features of the invention result from the treating composition on the glass fibers having a nonionic surfactant and a quaternary ammonium salt and a polar functional coupling agent, with or without the presence of a polyol protecting material.

I claim:

1. Aqueous dispersion of chopped glass fiber strands, comprising: water and chopped glass fibers having a coating of an aqueous chemical treating composition, consisting of;
   a. nonionic surfactant,
   b. cationic quaternay anmonium salt surfactant, where the ratio of the nonionic to cationic surfactants is about 1 to about 99 to about 99 to 1,
   c. polar functional coupling agent selected from the group consisting of organo metallic and organo- silane coupling agents having polar organic functionalities, and
   d. water in an amount to give a total solids content that is effective for applying the composition to glass fibers, where the chopped glass fibers have a length of about 1/16 of an inch to about 3 inches and are present in an amount of about 0.001 to about 5 weight percent of the dispersion.

2. Aqueous dispersion of claim 1, which also has dispersing agents present before the addition of added with the addition of the chopped treated glass fibers.

3. Aqueous dispersion of claim 2, wherein the dispersing agent is polyoxy alkylated tallow amine.

4. Aqqeous dispersion of claim 1, which also has hydroxy or alkoxy methyl cellulose thickening agents.

5. Aqueous dispersion of claim 1, which also has thickening agents added before the addition of the glass fiber.

* * * * *

UNITED STATES PATENT AND TRADEMARK OFFICE
CERTIFICATE OF CORRECTION

PATENT NO. : 4,626,289

DATED : December 2, 1986

INVENTOR(S) : Ed C. Hsu

It is certified that error appears in the above-identified patent and that said Letters Patent is hereby corrected as shown below:

Column 20, line 11, delete "of" and insert --or--,

Column 20, line 15, delete "Aqqeous" and insert --Aqueous--.

Signed and Sealed this

Eighth Day of September, 1987

Attest:

DONALD J. QUIGG

*Attesting Officer*  *Commissioner of Patents and Trademarks*